US010621075B2

(12) United States Patent
Buege

(10) Patent No.: US 10,621,075 B2
(45) Date of Patent: Apr. 14, 2020

(54) PERFORMANCE TESTING OF A NETWORK SEGMENT BETWEEN TEST APPLIANCES

(71) Applicant: Spirent Communications, Inc., Sunnyvale, CA (US)

(72) Inventor: Brian Buege, Dallas, TX (US)

(73) Assignee: SPIRENT COMMUNICATIONS, INC., Sunnyvale, CA (US)

( * ) Notice: Subject to any disclaimer, the term of this patent is extended or adjusted under 35 U.S.C. 154(b) by 913 days.

(21) Appl. No.: 14/586,180

(22) Filed: Dec. 30, 2014

(65) Prior Publication Data
US 2016/0191349 A1     Jun. 30, 2016

(51) Int. Cl.
G06F 11/36      (2006.01)
H04L 12/24      (2006.01)
H04L 12/26      (2006.01)
H04L 12/801     (2013.01)

(52) U.S. Cl.
CPC ...... *G06F 11/3684* (2013.01); *G06F 11/3688* (2013.01); *G06F 11/3692* (2013.01); *H04L 41/5038* (2013.01); *H04L 41/5067* (2013.01); *H04L 43/06* (2013.01); *H04L 43/062* (2013.01);
(Continued)

(58) Field of Classification Search
CPC ..... G06Q 10/06; H04L 41/5009; H04L 43/10; H04L 41/147; H04L 43/50; H04L 47/2475; G06F 11/3006; G06F 11/3409; G06F 2201/865; G06F 11/3414; G06F 2201/875;
(Continued)

(56) References Cited

U.S. PATENT DOCUMENTS 6,078,953 A * 6/2000 Vaid ............... H04L 12/2856
                                                370/235
6,240,458 B1 * 5/2001 Gilbertson ............. G06F 13/14
                                                709/232
(Continued)

FOREIGN PATENT DOCUMENTS

EP     2512066 A1 * 10/2012

OTHER PUBLICATIONS

Spirent Axon, "Spirent® Axon, Easy. Affordable. Practical, brocheure" 2013, Spirent Communications, Inc., 4 pages.
(Continued)

*Primary Examiner* — David P Zarka
(74) *Attorney, Agent, or Firm* — Haynes Beffel & Wolfeld, LLP; Ernest J. Beffel, Jr.; Paul A. Durdik

(57) ABSTRACT

Computer networks include multiple hardware and software devices, each working together to provide a favorable user experience to an operator. Many of these devices are built to standards that have been published by international standards organizations. These standards include functional test criteria that, when executed successfully, assure functionality of the device within a group of devices. The technology disclosed maintains libraries of canned tests based on these published standards. In addition, the technology disclosed can collect, adapt, and execute sets of predefined transactions to a target test network. This will validate that the target test network can scale up to a desired combination of transactions of different types. This is accomplished by manipulating example transaction sets captured from probes or routers that save network accounting records from a model network.

27 Claims, 9 Drawing Sheets

Example Test Network

(52) U.S. Cl.
CPC ............ *H04L 43/067* (2013.01); *H04L 43/50* (2013.01); *H04L 43/045* (2013.01); *H04L 47/19* (2013.01)

(58) Field of Classification Search
CPC ............ G06F 11/3419; G06F 11/3428; G06F 11/3476; G06F 13/00
USPC ........................................................ 709/224
See application file for complete search history.

(56) References Cited

U.S. PATENT DOCUMENTS

| | | | | |
|---|---|---|---|---|
| 6,892,236 | B1* | 5/2005 | Conrad | G06F 11/3409 709/203 |
| 8,326,970 | B2* | 12/2012 | Cherkasova | G06Q 10/06 709/224 |
| 2003/0074606 | A1* | 4/2003 | Boker | G06F 11/3495 714/42 |
| 2004/0030747 | A1* | 2/2004 | Oppermann | G06F 11/3414 709/203 |
| 2004/0103189 | A1* | 5/2004 | Cherkasova | H04L 29/06027 709/224 |
| 2005/0240799 | A1* | 10/2005 | Manfredi | H04L 41/147 714/4.1 |
| 2006/0047794 | A1* | 3/2006 | Jezierski | H04L 41/0823 709/221 |
| 2006/0140128 | A1* | 6/2006 | Chi | H04L 43/50 370/241 |
| 2007/0078943 | A1* | 4/2007 | Daniels | G06F 15/16 709/217 |
| 2008/0162690 | A1* | 7/2008 | Karagounis | H04L 12/66 709/224 |
| 2009/0119301 | A1* | 5/2009 | Cherkasova | G06Q 10/06 |
| 2010/0088549 | A1* | 4/2010 | Duffield | G06Q 10/063 714/38.1 |
| 2010/0153529 | A1* | 6/2010 | Moser | H04L 41/5038 709/223 |
| 2010/0333072 | A1* | 12/2010 | Dulip | G06F 11/3419 717/128 |
| 2013/0064095 | A1* | 3/2013 | Chew | H04L 43/50 370/241 |
| 2013/0070584 | A1* | 3/2013 | Hutchison | G06F 11/3058 370/216 |
| 2013/0088977 | A1* | 4/2013 | Baillargeon | H04L 43/0811 370/251 |
| 2013/0275585 | A1* | 10/2013 | Santhanakrishnan | G06F 11/3476 709/224 |
| 2013/0282545 | A1* | 10/2013 | Gounares | G06F 11/3093 705/35 |
| 2014/0019560 | A1* | 1/2014 | Li | H04L 43/50 709/206 |
| 2014/0297850 | A1* | 10/2014 | Duffield | G06Q 10/063 709/224 |
| 2015/0120914 | A1* | 4/2015 | Wada | H04L 43/0882 709/224 |

OTHER PUBLICATIONS

Spirent, "Test Reference—Network Infrastructure Tests," Jun. 26, 2014, Spirent Communications, Inc.,<https://support.spirentforbusiness.com/support/solutions/articles/1000009746-test> Retrieves, Oct. 11, 2014, 17 pages.

Spirent Axon, "Application Note—Testing Made Simple," 2014, Spirent Commuincations, Inc., <www.spirent.com>, pp. 1-18.

Spirent, "Support: Spirent Enterprise Customer Portal," 2014, Spirent Communications, Inc., <https://support.spirentforbusiness.com/support/horne>, retrieved Oct. 11, 2014, 5 pages.

Spirent, "Scenarios:Spirent Enterprise Customer Portal," 2014, Spirent Communications, Inc., <https://support.spirentforbusiness.com/support/solutions/folders/1000034456>, retrieved Oct. 11, 2014, 10 pages.

Spirent, "Enable the new Traffic Recorder (beta): Spirent Enterprise Customer Portal," Jun. 26, 2014, Spirent Communications, Inc., <https://support.spirentforbusiness.com/support/solutions/articles/1000026580-enable-the-new-traffic-recorder>, Retrieved Oct. 12, 2014, 1 page.

Spirent, "How to enable the NetFlow probe: Spirent Enterprise Customer Portal," Apr. 2, 2014, Spirent Communications, Inc., <https://support.spirentforbusiness.com/support/solutions/articles/1000020325-how-to-enable-the-netflow>, Retrieved Oct. 12, 2014, 2 pages.

* cited by examiner

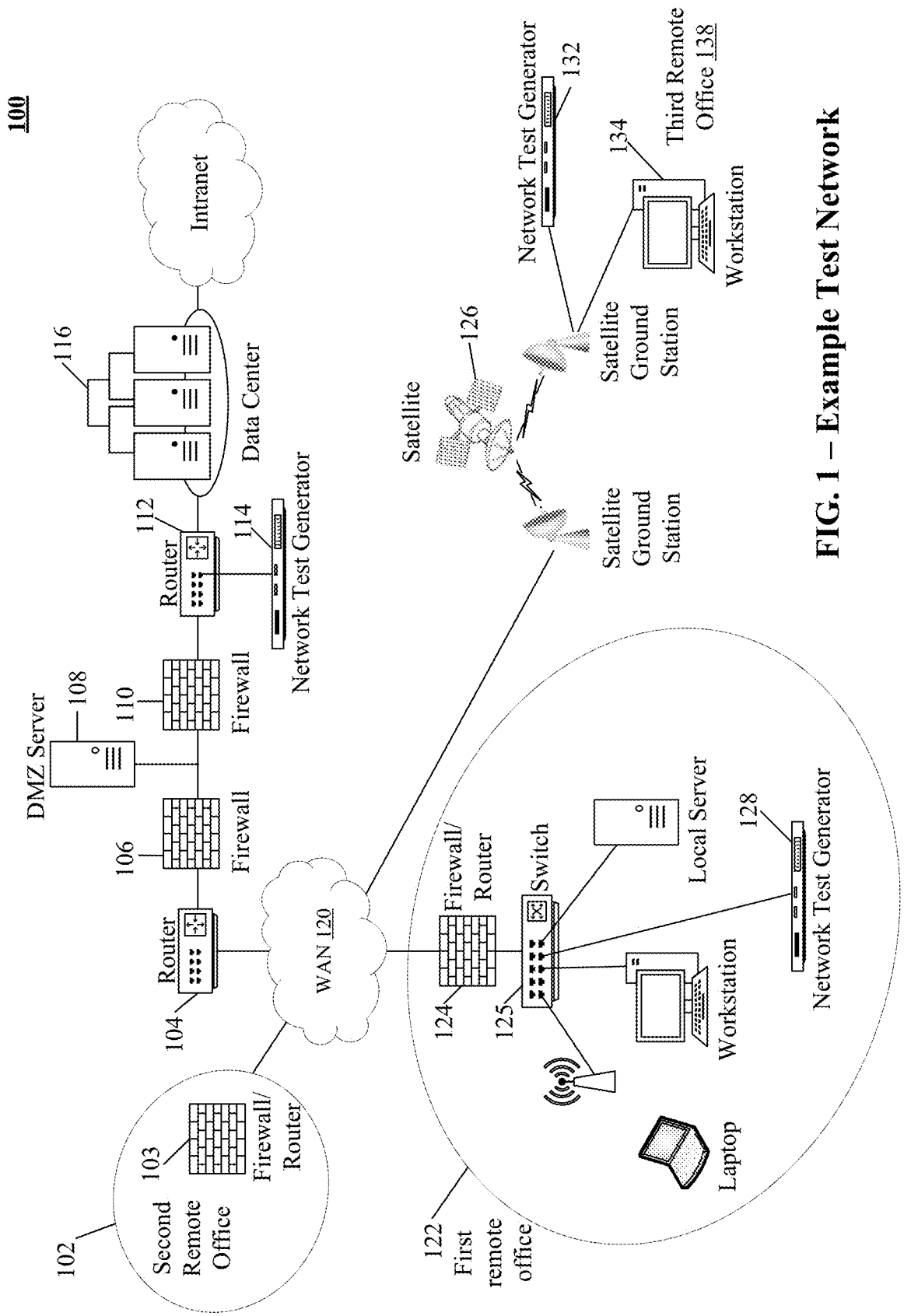
FIG. 1 – Example Test Network

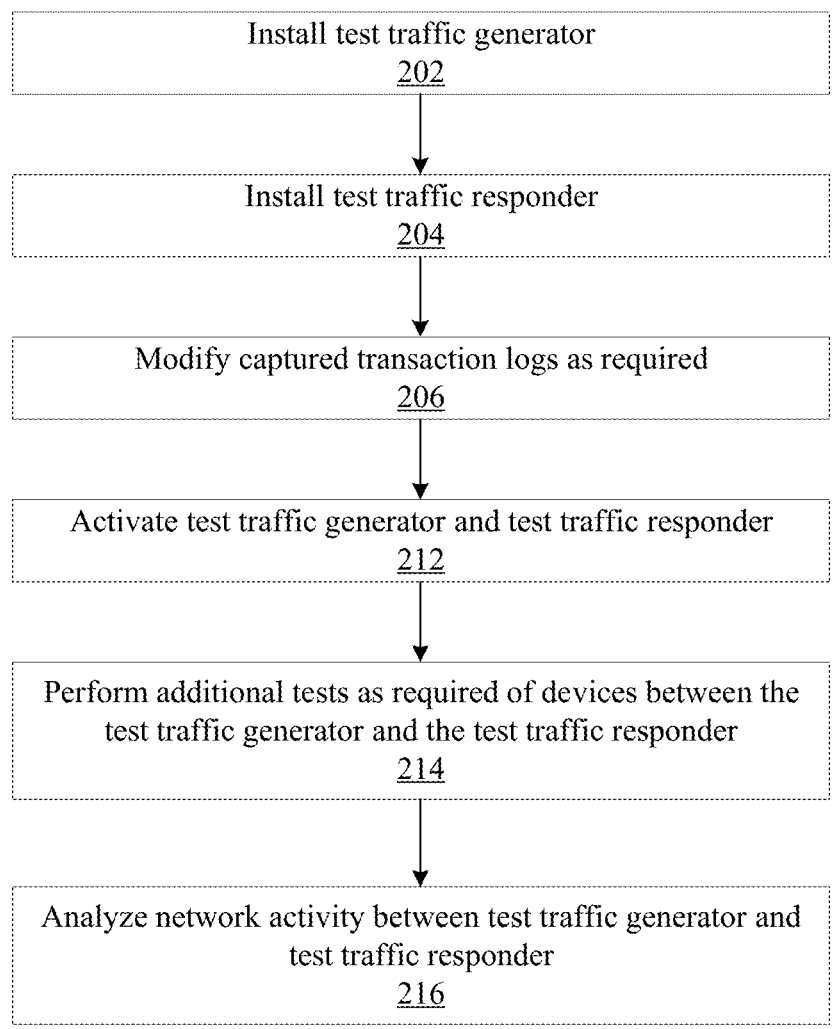
FIG. 2 – Method for Performing Network Test

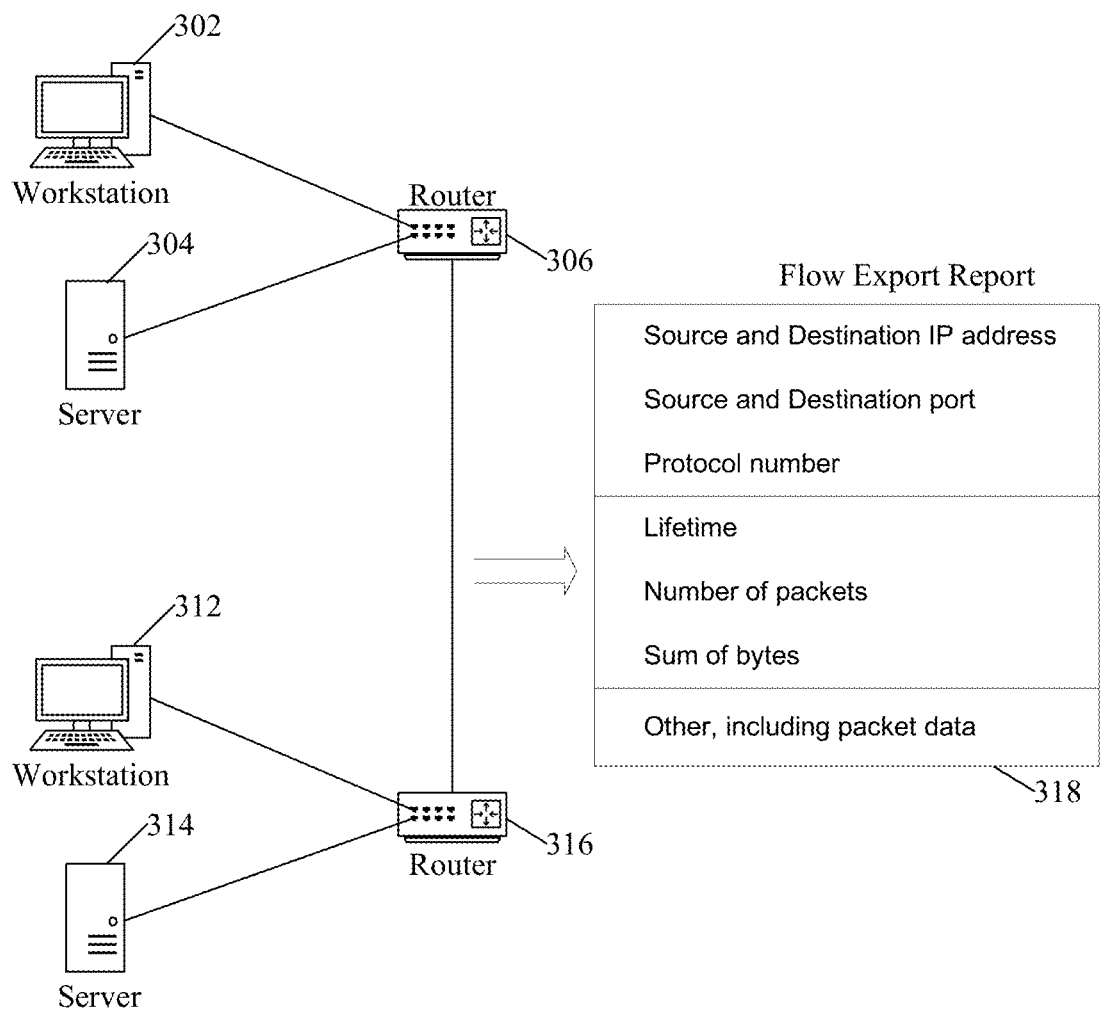
FIG. 3 – Network accounting data capture

400

| OSI Model |||||
|---|---|---|---|---|
| | Data unit | Layer | Function | |
| Host layers | Data | 7. Application | Network process to application | — 402 |
| | | 6. Presentation | Data representation, encryption and decryption, convert machine dependent data to machine independent data | |
| | | 5. Session | Interhost communication, managing sessions between applications | |
| | Segments | 4. Transport | Reliable delivery of packets between points on a network. | — 404 |
| Media layers | Packet/Datagram | 3. Network | Addressing, routing and (not necessarily reliable) delivery of datagrams between points on a network. | — 406 |
| | Bit/Frame | 2. Data link | A reliable direct point-to-point data connection. | — 408 |
| | Bit | 1. Physical | A (not necessarily reliable) direct point-to-point data connection. | |

FIG. 4 – Open Systems Interconnect (OSI) Model

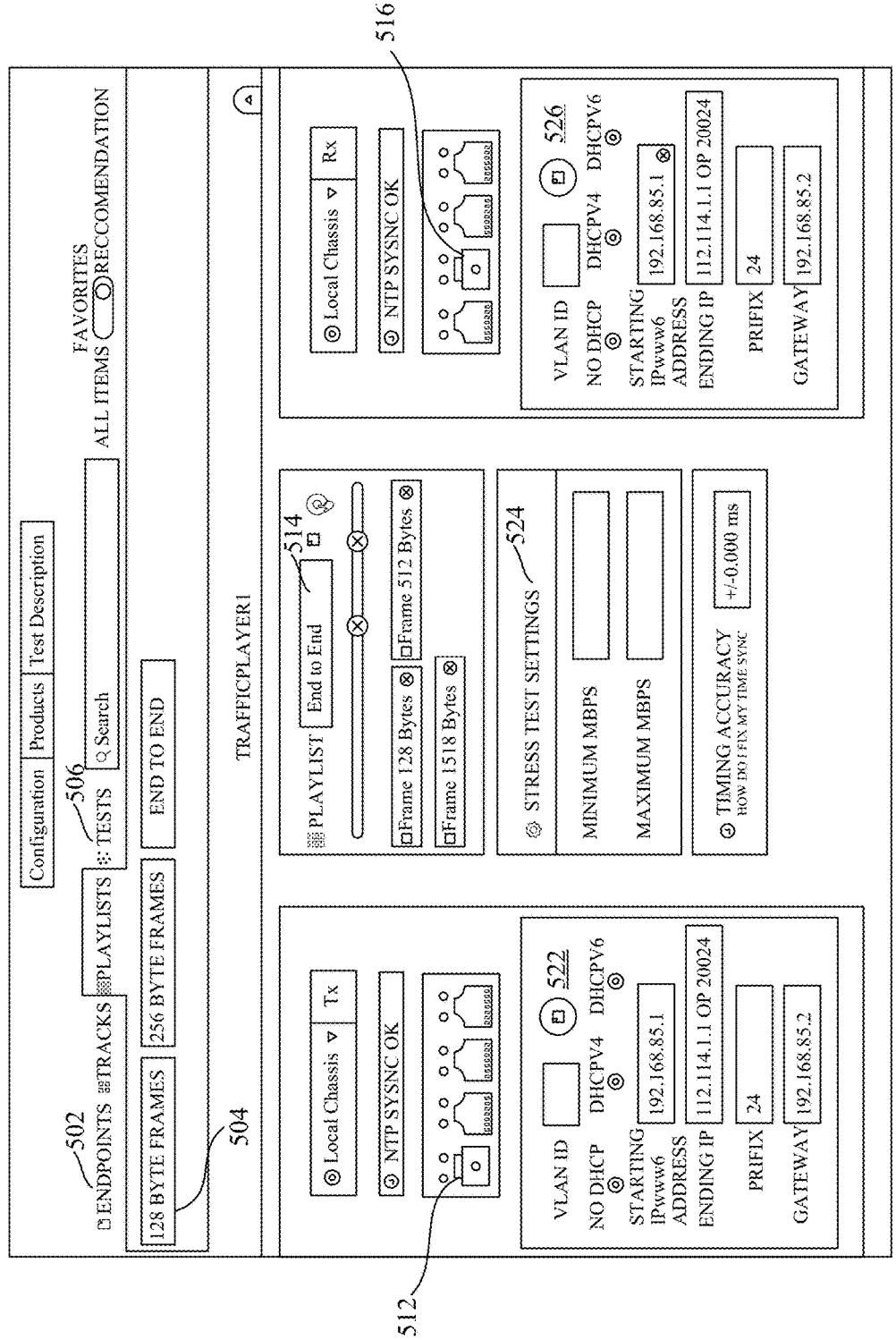
FIG. 5 – Device Control Panel

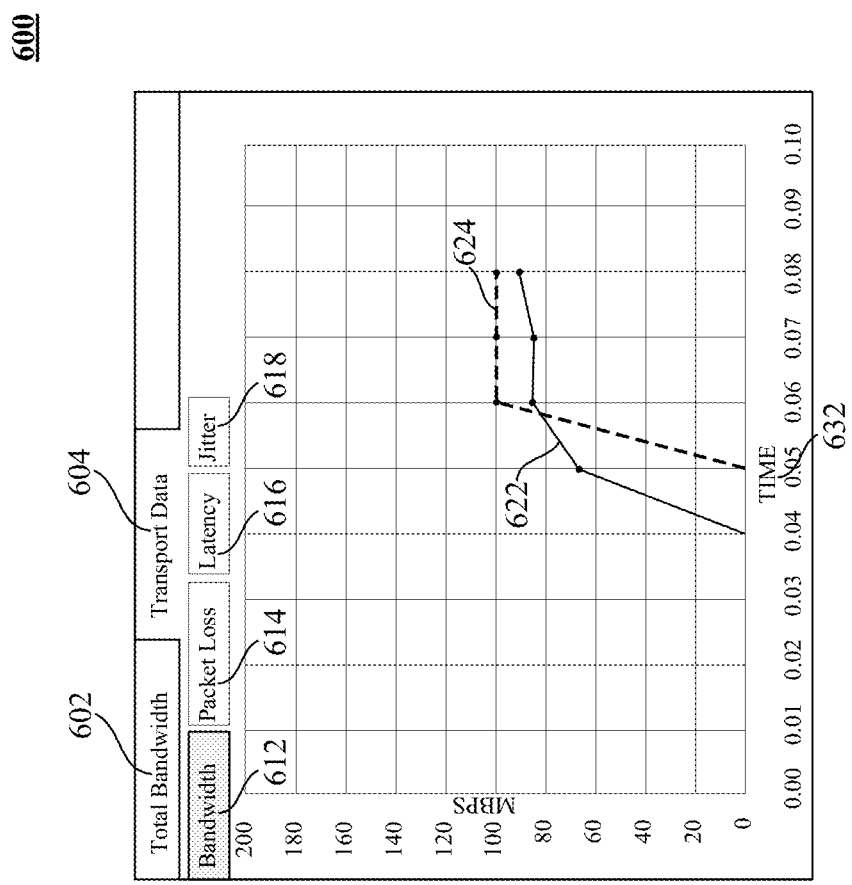
FIG. 6 – Results of Network Tests Generated From Network Accounting Information

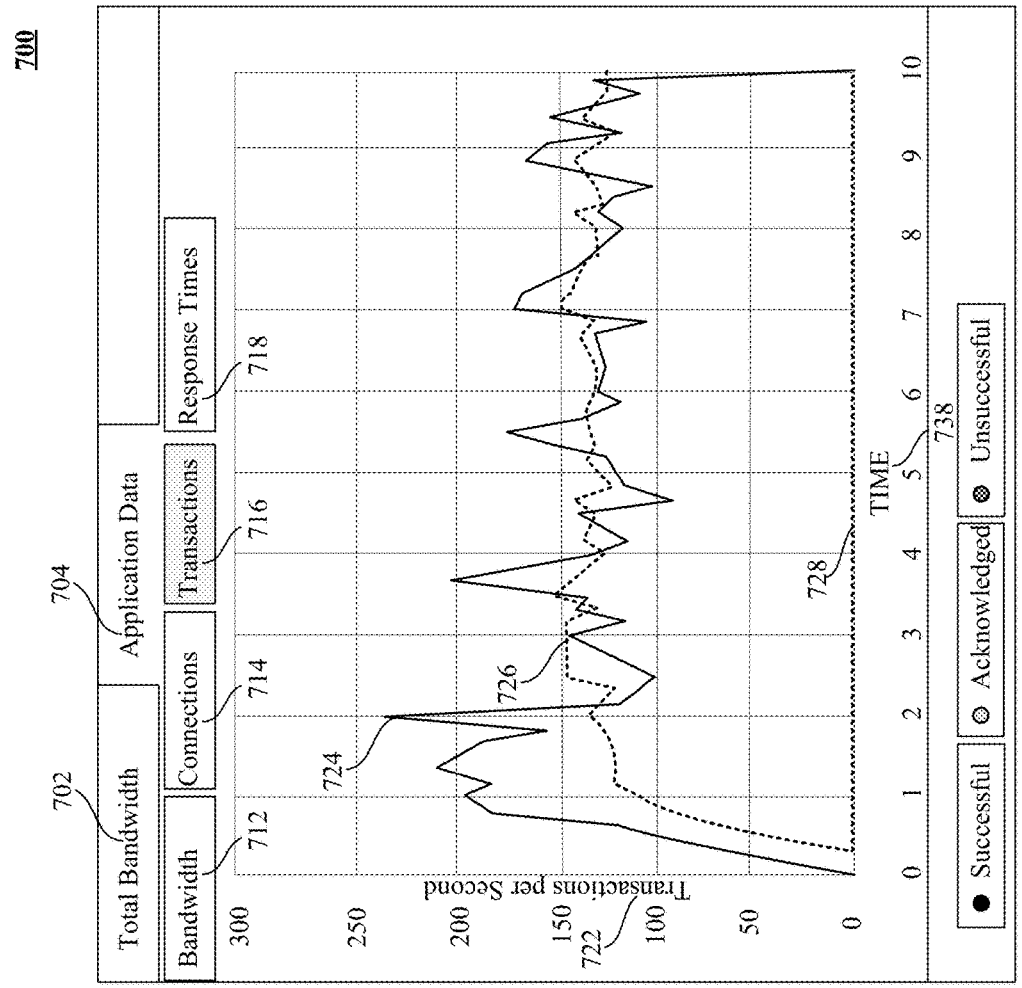
FIG. 7 – Results of Network Test Showing Application Transactions

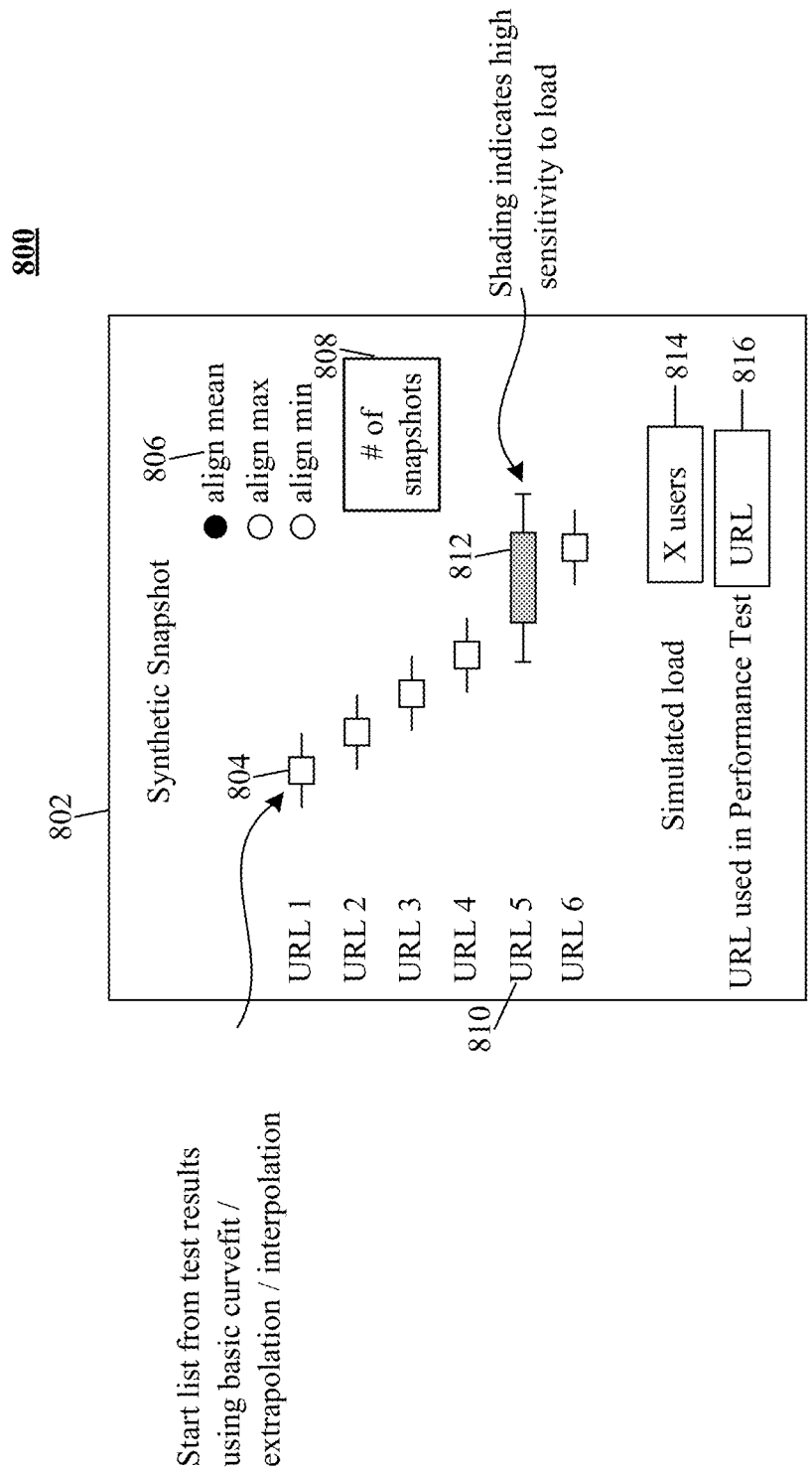
FIG. 8 – Box Plot for Distribution of Test Results

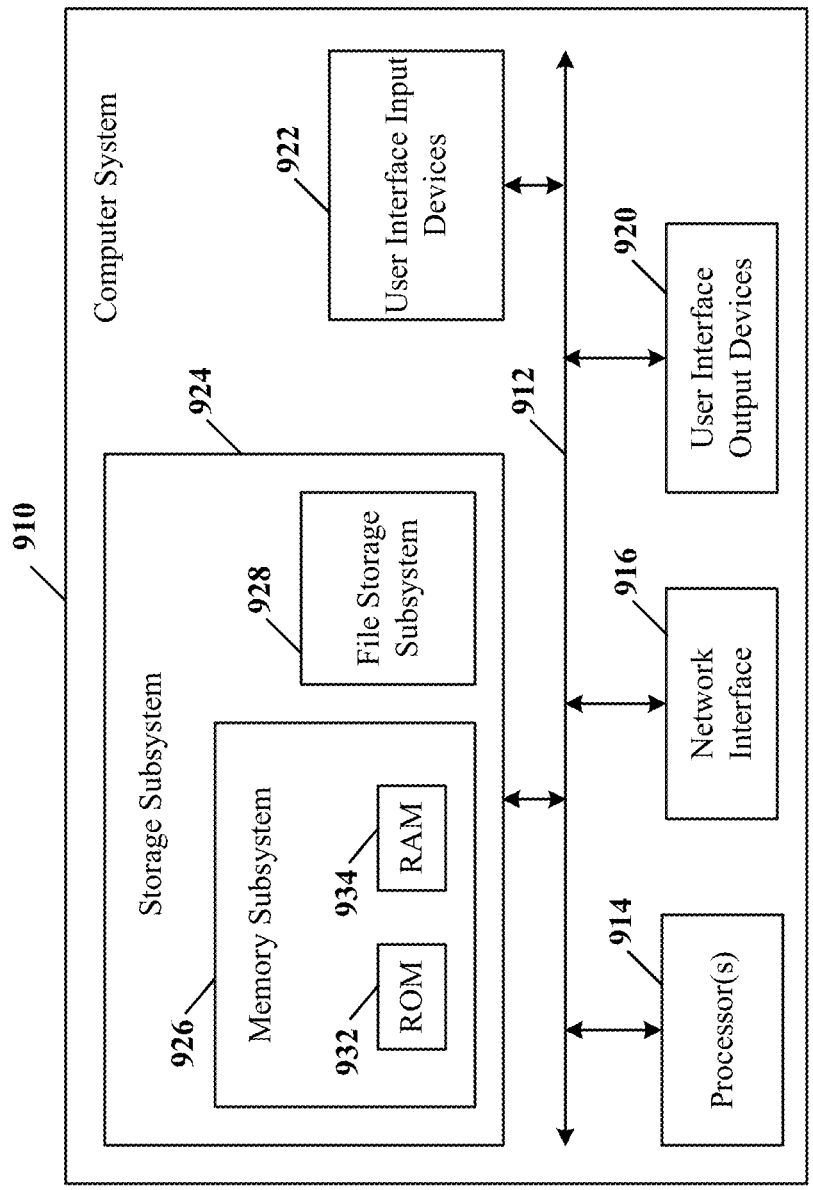
FIG. 9 – Computer System

PERFORMANCE TESTING OF A NETWORK SEGMENT BETWEEN TEST APPLIANCES

CROSS-REFERENCE TO RELATED APPLICATIONS

This application is related to the following non-provisional applications which are hereby incorporated by reference:

U.S. application Ser. No. 14/587,997, filed Dec. 31, 2014, entitled "CONDUCTING PERFORMANCE SNAPSHOTS DURING TEST AND USING FEEDBACK TO CONTROL TEST BASED ON CUSTOMER EXPERIENCE PARAMETERS," by Guilherme Hermeto and Brian Buege; and U.S. application Ser. No. 15/236,262, filed Aug. 12, 2016, entitled "METHOD TO CONFIGURE MONITORING THRESHOLDS USING OUTPUT OF PERFORMANCE TESTS," by Brian Buege.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Enterprise systems take advantage of computer networks that include multiple hardware and software devices, each working together to provide a favorable user experience to an operator. Many of these devices are built to standards that have been published by international standards organizations. Some standards are accompanied by functional test criteria that can be tested to improve the likelihood of successful interoperability of systems. However, none of the standard-related tests approximates the traffic mix and variability of enterprise networks.

Accordingly, an opportunity arises to develop practical test measures that help a tester approximate the mix and variability of enterprise network traffic.

SUMMARY

The technology disclosed can be implemented using a network test appliance with a browser interface to regenerate a traffic mix or variation on a traffic mix determined by surveying an existing network segment, such as a selected enterprise network segment or a vendor-surveyed, anonymous network segment. Session flow records that can be extended during capture with information that improves test fidelity. Session flow records can be repurposed from general logging to generation of test traffic.

The technology disclosed can include libraries of predefined tests of application protocols, including test directed to application, transport, data and other protocol layers. In addition, the technology disclosed can collect, generate, and run tests constructed based on sets of predefined network traffic types on a target test network for a network test. This validates that the target test network can scale up to a desired combination of transactions of different types.

Other features and aspects of the technology disclosed appear in the drawings, specification and claims that follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 is a block diagram that illustrates an example test network.

FIG. 2 is a flow diagram for performing a network test.

FIG. 3 demonstrates network accounting data capture

FIG. 4 is a representation of the Open Systems Interconnect (OSI) Model

FIG. 5 is an example of the Device Control Panel of one device

FIG. 6 shows results of a Network Test showing bandwidth utilization

FIG. 7 shows results of a Network Test showing application transactions per second FIG. 8 is an example of a box plot used to describe the distribution of test results FIG. 9 is a block diagram of an example computer system.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Increasingly complex networks and application suites are challenging to test. Both interconnected business locations and connections with customers have many links and load scenarios that can be tested. A testing engineer can find it difficult even to catalogue the tests to run, much less to design or implement a realistic mix of load tests. This problem of complexity arises both for enterprise systems that are inward facing and for cloud-based systems that are customer facing.

Consider the implications of testing set-up of a new location for a large box retail outlet. Examples of large box retailers are hardware stores and discount warehouses. At one large box retail outlet, the consumer sees so-called wall-of-eyes video advertising on TVs to their right, as the walk in the door, and a member services desk to their left. In the back of the store are a pharmacy, optometrist and audiologist. The consumer interacts with a Point-of-Sale (PoS) system on the way out. Employees of the store use phone, email, inventory control, purchasing, delivery tracking, training and other systems. Traffic includes VoIP, video, BYOD, and cloud services, in addition to conventional data center traffic. The mix and volume of packet traffic from these many systems fluctuates during the day. The packets are in various formats and packet frame sizes, subject to different transport protocols and used by a range of programs. Packet sources and destinations are numerous, both at the IP and port levels. The mix of traffic from even a single large box retail outlet is difficult to replicate in a test.

The technology disclosed addresses enterprise system testing with automated construction of test traffic loads stored as test traffic mix profiles for one or more time intervals, which may take the form of a playlist or test script that can be executed against multiple time intervals without requiring user intervention. A large box retailer that is setting up store #101 has or can compile traffic logs from historical network accounting records. Traffic logs from data center(s) and one or more prototype stores can be analyzed to determine a realistic mix of network traffic. The technology disclosed combines traffic log analysis with address adaptation and test device selection to generate tests. The tests have varying traffic mix segments to reflect loads throughout the day and to test specific protocols and ports used by business applications. Tests can be run on lightweight test hardware such as Spirent's Axon® platform, which is a network test appliance. Tests also can be run on a high volume, high precision platform such as Spirent's TestCenter™. In some implementations, a workstation or server could be programmed to perform testing functions and to use a test traffic mix generated by log analysis.

Enterprise tests can be conducted with a single test device but more often involve multiple test devices programmed to cooperate during a test. In the store #101 scenario, the store is located in a different state than the supporting data center (DC). The test determines the telecom vendor's compliance with its SLA. A first test device is positioned at store #101 and the second device at the DC. Traffic mixes developed from log analysis are loaded onto one or both of the test devices. IP addresses or address ranges are configured for source and destination of traffic. Physical ports on the test devices are allocated to inbound and outbound traffic. The test proceeds in one or more segments. In some tests, the traffic load steps up during a test segment, to test the enterprise system's load tolerance.

Automatic test mix generation and variation that simulates a work day, week or month cycle creates a realistic scenario that can help prevent surprises. This addresses the inward facing test challenge, which presents different complexities than the customer facing challenge.

Introduction

A network is constructed of components that can generally be described using layers of the OSI (Open Systems Interconnection) model, which is illustrated in FIG. 4. Organizing communication in layers structures hardware and software architecture and ultimately allows for more flexibility in vendor selection. For example, a router that works at layer 3 406 of the OSI model can be made by a different vendor than a firewall that functions at layers 3 through 7 of the OSI model 406. Application programs at layer 7 402 of the OSI model can abstract and use the lower layers without much attention to details in those layers. A network switch 125 that works at the application data link layer 408 from one vendor can communicate with a router 103, 104, 112, 124 from another vendor at the network layer 406. The router 103, 104, 112, 124 can, in turn, transmit packets containing data formatted to conform to an application transport layer 404. Virtual Local Area Networks (VLANs), which allow logical network definitions of distinct broadcast domains across distributed physical devices, can be defined across complex networks. As well, Multi-protocol Label Switching (MPLS), which is sometimes referred to as OSI Layer 2.5, can also be configured to execute on equipment from multiple vendors in widely distributed networks. This coexistence of devices and logical layering is built on specifications created and documented by a number of organizations. Standards from bodies such as the International Organization for Standardization (ISO, the authors of the OSI model), the American National Standards Institute (ANSI), the Internet Engineering Task Force (IETF), the Telecommunications Industry Association (TIA), and the Institute of Electrical and Electronics Engineers (IEEE), amongst others, publish standards used by the computer industry and its providers. These groups, as well as others, publish standards on how computer equipment, including network equipment, can be tested to prove conformance to their standards.

A computer network can include the following components:
- hosts and clients, such as computers, servers, and mobile devices
- network devices such as routers, switches, and firewalls
- links such as copper, fiber optics, and wireless
- protocols such as IP, TCP, BGP, UDP, and SMTP
- applications running on hardware There are a large number of combinations of computer network components possible. In addition to conformance, or functionality testing to validate that the building blocks used in the construction of the computer network work to standards, there is also performance testing that validates that the combination of components selected performs as needed. For example, a network that includes slow network connections across large distances may work within the accepted standards, but it may not perform adequately for specific business needs that require higher bandwidth or lower latencies. In this case, modifications to the architecture, such as modifying the speed of the network devices or moving assets closer together geographically may be necessary. The technology disclosed is configured to validate infrastructure based on these published standards as well as on desired performance measures.

There are a number of application layer protocols that impact testing configurations. Each protocol has specific testing requirements. A list would include the following:

BitTorrent: a peer-to-peer file sharing protocol used to reduce the server and network impact of distributing large files.

BitTorrent Bandwidth: configuration settings within Bit-Torrent.

BitTorrent Tracker Traffic: a tracker is a machine that knows where the BitTorrent files are that an operator wants to download or share, and the traffic is requests for files.

FTP: File Transfer Protocol; a standard network protocol used to transfer computer files from one host to another over TCP.

Gnutella: a large open source peer-to-peer network protocol.

Gnutella 1: an updated version of Gnutella.

Gnutella 2: a major rewrite of Gnutella 1, including a new packet format.

Gtalk: an open protocol instant messaging service offered by Google that offers both text and voice communications.

Gtalk XMPP Only: XMPP (Extensible Messaging and Presence Protocol), a protocol used by operating systems that do not support the Google Talk client so that they can communicate with Gtalk clients.

HTTP: Hypertext Transfer Protocol is an application protocol for distributed, collaborative, hypermedia information systems.

Internet Television: the digital distribution of television content to a potentially large number of users via the Internet.

LDAP: Lightweight Directory Access Protocol is an open, vendor-neutral, industry standard application protocol for accessing and maintaining distributed directory information services over an IP network.

MySQL: an open source relational database management system, now owned by Oracle.

NFS: Network File System is a distributed file system protocol originally developed by Sun Microsystems, which allows a user on a client computer access to files over a network.

Oracle: an open source relational database management system.

Raw TCP: a type of socket that allows access to the underlying transport provider, such as ICMP. To use raw sockets, an application needs to have detailed information on the underlying protocol being used.

Real Time Streaming Protocol (RTSP): a network control protocol designed for use in entertainment and communications systems to control streaming media servers.

Remote Desktop: a software or operating system feature that allows a computer's desktop environment to be run on one system, while being displayed on a separate client device.

Skype: a voice and video chat service, which also includes instant messages, exchange files and images, send video messages, and create conference calls.

Skype TCP: a closed source protocol which is not interoperable with most other VoIP networks, and is being replaced by the Microsoft Notification Protocol 24.

SMB: Server Message Block, also known as Common Internet File System (CIFS), is mainly used for providing shared access to files, printers, and serial ports.

SMB DCE/RPC for printer: The older version of DCE/RPC ran in a named pipe over SMB. This was a very slow protocol. The new version is sent over TCP, which improves performance over WAN networks.

SQL: Structured Query Language; a special purpose programming language for managing data in a database based on relational algebra and tuple relational calculus. Also, Microsoft's version of a relational database management system.

Telepresence: introduced by Cisco Systems, referring to technologies that allow a person to feel as if they were present at a place other than their true location. Telepresence videoconferencing is an extension of videotelephony.

Video: a series of still pictures communicated at a rate to achieve a comfortable illusion of a moving image.

Video Call: a videotelephony technology, which combines a video signal with an audio signal, wherein the parties can both see and hear each other. When there are more than two parties, this is referred to as a video conference.

Voice Call: in this context, it is the digitized version of audible signal (VoIP), which uses network technology as a medium.

Yahoo Commands Only: the Yahoo Messenger Protocol (YMSG), Yahoo's messaging alternative to http, which they use for messaging, off-line messaging, file transfer, chat, conferencing, voice chat, webcams, and avatars.

The protocols listed above are representative, and are not comprehensive or all inclusive.

FIG. 1 is a block diagram that illustrates an example network with test equipment in place. In one implementation, a corporate network may have specific communications requirements between a data center 116 and a first remote office 122. Those requirements can include specific volumes of data for VoIP, point of sale, credit card, timekeeping, email access, inventory control, Quality of Service (QoS), and role based access, amongst others. Second 102, third 138, and possibly other additional remote office or locations can be part of the corporate network. For instance, a retailer may have hundreds, thousands or even tens of thousands of stores.

A network, typically a wide area network (WAN) 120 implements the corporate network, connecting network segments in different locations. The WAN 120 can include copper or other metallic conductors, optical fiber and/or wireless links.

In this example, the corporation has a second remote office 102 of similar size and network equipment to the first remote office 122. A test objective can be to simulate the traffic experienced between the second remote office 102 and the data center 116 on the network between the first remote office 122 and the data center 116. The example routers 103, 104, 112 in the corporate network can be configured to save network accounting records, which can be NetFlow compliant, Internet Protocol Flow Information Export (IPFix) compliant (a standard of IETF), pcap (packet capture) compliant or some other flow export format. A network flow in NetFlow is a unidirectional stream of packets, identified by source and destination IP addresses, IP protocol, source and destination ports, and Type of Service byte. Inbound interface and other information can be tracked per flow. Sampling is allowed by these protocols, so traffic volume and flows can be extrapolated from samples. In some implementations, the network test generator 114, 128, 132 includes a packet capture module or a traffic analysis module that summarizes traffic or a sample of traffic on a network in a form suitable for generating a test traffic mix. A traffic generator is a computing device capable of executing a program which simulates the network traffic associated with the activities of one or more end users.

A flow export report 318 can comprise accounting records generated compliant with NetFlow or IPFix technologies. This can be an extensible SNMP-based report of network activity. Session level and even more detailed application specific can be included in the flow export report 318.

Regeneration of traffic from traffic mix data, as opposed to replay of actual traffic, avoids anti-replay technology built in to many protocols, such as SSL protections against man-in-the-middle attacks. Test traffic can be generated from historic metadata in the flow export report 318 that identifies senders, receivers, ports and protocols used. The number of packets passing each direction in a flow within a session also can be recorded in the flow export report 318. During regeneration, the packet header data is based on the flow export report 318, with customizations as appropriate. Packet payload data to be generated from patterned or random binary data or played back from a library of examples.

FIG. 2 illustrates a workflow to capture, adapt, and regenerate the necessary data for validation of a network between two points. In 202, a network test generator 114, 128, 132 is installed in the role of a test traffic generator 128 at the first remote office 122. Another network test generator 114, 128, 132 is then installed 204 as a test traffic responder 114. Data captured in a flow export report 318 is imported into the test traffic devices 128, 114. The test can occur in a number of ways. For example, the original equipment connected to the switch 125 and the router 112 can be disconnected so that there are not any addressing issues. As well, the test traffic devices 128, 114 can modify network address information for the target test 206, and the network test can run simultaneously with a live network. Alternatively, a VLAN can be configured between the switch 125 and the router 112 specifically for the test. The flow export report 318 contains the metadata concerning all selected transactions processed by a selected router 306, 316.

In step 212, the test traffic generator 202 regenerates adapted traffic based on the flow export report 318, and at least one test traffic responder 204 responds to the traffic generated by 202 on behalf of the devices captured in the flow export report 318. For test purposes, one test appliance can simulate activity by many network devices. As outlined below, additional tests 214 can be configured to be run on the network test generators. Once each iteration of testing has completed, the data is collected from the test traffic generator 202 and the test traffic responder 204 for analysis 216. Any Ethernet port on the network test generator 114, 128, 132 can be configured either as a traffic generator or a traffic responder, and can be actively testing simultaneously with all other ports.

One implementation of a data collection methodology for the network test generators is illustrated in FIG. 3. A flow export system 300 creates an example flow export report 318, which summarizes the flow export from routers 306 and 316. The flow export system 300 can be a module running on a router or it can be a network tap that monitors traffic on a network flowing between two points. In one example, the flow export report 318 can be configured as a capture or summary of all network traffic between a workstation 302 and a server 314. It can also capture specific protocol packets such as TCP, or application-specific packets between a workstation 312 and a server 304. In another example, the routers 306, 316 can be configure to capture a specific set of data, for all required services, for a defined period of time between two or more devices on the network. Accounting technologies support capture of supplemental information. In addition to standard collection of session flow data, application related data can be collected to increase test fidelity. In an SQL flow, for instance, the number of rows returned in response to a query can be captured in supplemental information. Then, the flow simulation can better adapt the data payload information returned, based on the supplemental information. Multiple flow export reports can be collected, adapted, and combined for traffic regeneration at some future time.

Network test generators 114, 128, 132 can test the network infrastructure at any layer from layer 2 408 to layer 7 402 of the OSI model 400. The tests that it can perform include, but are not limited to:
  Network Performance Modeling
  Network Stress Test
  Network Latency
  Mixed Traffic Performance Modeling
  Network QoS Performance
  Site to Site Performance
  Site to Site with SLA Verification
  Site to Site Application Performance
  Mixed Protocol IPv4 and IPv6 Performance
  HTTP Web Application Performance Test The tests can address any combination of application protocols related to voice, video, http, ftp, messaging, or other common protocol.

A plurality of report types available for each of the tests performed, including:
  a. Chart and track progress during tests
  b. Charted results
  c. Result details
  d. Printable reports
  e. Export to CSV The network test generator 114, 128, 132 allows for the inspection of a set of transaction logs chosen for the test, and the building of a test configuration from those logs. Geographies, specific volumes, and specific device hit information response over time can be generated. This allows for the generation of a test that can scale up or down from past experience, and that can move from one set of facilities to another. For example, it allows for the regenerate a prior media campaign or launch, and allows for increasing or decreasing the size and scope of the test for campaigns of different sizes. It can also be used for a plurality of tests for a plurality of protocols for a second remote office 102 based on the transaction history or histories of a first remote office 122.

Applications

In one implementation, a flow export report 318 is captured by the routers 103, 104, 112 between the data center 116 and the second remote office 102. The flow export report 318 is then loaded into the network test generator 128. In this example, the network test generator 128 is a test traffic generator, but it can also be a test traffic responder, or both a generator and responder at the same time. The flow export report is also loaded into the network test generator 114. In this example, the network test generator 114 is a test traffic responder, but it can also be a test traffic generator, or both a generator and responder at the same time. The test traffic generator 128 is configured to regenerate test data from the flow export report 318 as if it were the second remote site 102 at the time when the flow export report 318 was created. The test traffic responder 114 is configured to regenerate the flow indicated in the flow export report 318 as if it were the data center 116 at the time when the flow export report 318 was created. The technology disclosed will account for any address changes that need to be made in the flow export report 318 due to location changes through an address mapping file. Network addressing variables can be adapted to support any changes necessary for location or device changes. Packet data information can be generated in real time based on the metadata captured in the flow export report 318. Additional tests such as those outlined above can also be added to the test. As well, the test can be scaled up or down as needed. For example, the first remote office 122 being tested can have twice as many networked devices as does the second remote office 102. To scale the test, the network test generators 114, 128 can be configured to double the traffic and/or network device instances recorded in the flow export report 318.

As the test traffic generator 128 and the test traffic responder 114 generate the traffic indicated by the flow export report, or other transaction log file, they also capture performance metrics from intermediate devices, as well as overall performance metrics. These metrics can be analyzed to evaluate whether the network performance between the data center 116 and the first remote site 122 is within the target performance measures. In addition, selected tests as described above can be executed and evaluated for successful completion.

FIG. 5 illustrates an example GUI interface used to set parameters available in the network test generator 114, 128, 132. The flow export report 318, or other log file used to record traffic between a plurality of networks or network devices, is imported into the network test generator 114, 128, 132. The devices can be enumerated in the endpoints tab 502, where devices can be selected to simulate a different network than recorded in the flow export report.

The tests tab 506 is where additional tests, such as network latency testing and mixed protocol IPv4 and IPv6 performance testing, can be integrated with the testing built on the flow export report 318. Specific frame sizes 504 can also be tested for issues such as fragmentation of protocols such as NFS and rdump, and of associated data buffering in the various routing devices. In another implementation, other log files such as HTTP log files can be loaded into the technology disclosed 114, 128, 132 as part of the network test.

The network test generators 114, 128, 132 can be configured to use one, two, or more devices as part of the test. In one implementation, a test traffic generator module is connected to a first Ethernet port 512 of the network test generator 114, 128, 132, and a test traffic responder module is connected to a second Ethernet port 516 on the same device. In another example test, two network appliances are deployed and a WAN link 120 between them is tested. Each appliance can include a test traffic generator coupled to an output port and a test traffic responder coupled between input and output ports. In some implementations, the test traffic generator is also coupled to the input port with session states changing based on return traffic on an input port. Hardware also can be configured to use a physical port as logical input and output ports.

A network test generator 114, 128, 132 can participate in a plurality of test traffic generator and test traffic responder configurations. For example, in one implementation, the network test generators 114, 128, 132 can be configured to test a complex pattern of communications between the data center 116, the first remote office 122, and the third remote office 138. The configuration of each Ethernet port 522, 526, allows for localization of the transaction records in the flow export report 318. In another implementation, a goal of the test can be performance testing of the various network components in and between the three sites. A goal can also be to monitor specific devices for specific attributes such as error rates, response to packet losses, and so on.

The technology disclosed 114, 128, 132 can simulate thousands of stations and select multiple destinations simultaneously. Whatever exists in the netflow records can be reproduced. The sources and targets can be one-to-one, one-to-many, many-to-one, and many-to-many. The flow export report 318 can be scaled in size and complexity as required. Any given subset of a flow export report can be used to generate a traffic configuration file for a test or set of tests. As well, multiple flow export reports can be merged into one traffic configuration file. This allows for the creation of a traffic mix of any complexity making use of historical accounting data that records traffic type and mixes.

Testing by a network test generator 114, 128, 132 can be targeted toward specific protocols identified in the flow export report 318 or in other reports that document traffic between network devices.

During stress testing, the captured flow information can be duplicated or scaled to represent additional devices and session, so that the regenerated flow data stresses a target network. Typically, a stress test proceeds from a modest data flow to one that causes notable response degradation. An operator can identify minimum and maximum megabytes per send (MBPS) to be tested and traffic generated accordingly from the captured flow export report 318 data.

Once the test traffic generator(s) and test traffic responder(s) have completed the testing, test results can be analyzed. In some implementations, test performance can be obtained during the test, without waiting for completion. For instance, in a network stress test, bit errors, lost packets and (for reliable transport protocols) retries can be graphed against data volume. In another test, protocol errors or network latency can be graphed against traffic mix. These results, as well as thousands of others, can be reported.

Reporting for test results can occur at multiple levels. For example, reports can be generated that show total bandwidth utilization over time by device mapped to number of test users, packet loss over time by device, latency between any two devices, jitter, protocol connections, transactions, response times, and so on. Reports can be generated for any number of variables in any sort order, including at least all tests listed above.

FIG. 6 shows a report that has two tabs: one that shows total bandwidth used by the test 602, and one that shows the transport data used in the test 604. The total bandwidth tab has four sub-tabs; bandwidth 612, packet loss 614, latency 616, and jitter 618. The bandwidth 612 tab shows two protocols 622, 624 used in the test. With a time scale 632 in seconds, the first protocol 622 transaction set shown in this example begins to use measurable bandwidth 4 seconds into the test, and reaches 85 MBPS at around 6 seconds. The second protocol 624 begins to use measurable bandwidth at 5 seconds into the test, and reaches a maximum value of 100 MBPS six seconds into the test. Information such as the type of protocol, the data it contains, and the configuration of the protocol packets is available within the transport data tab 604.

FIG. 7 shows another example of a report for test results that also has two tabs: one tab that shows transaction bandwidth use by the test 702, and one that shows the application data used in the test 704. The application data 704 example has four sub-tabs: bandwidth 712, connections 714, transactions 716, and response times 718. The transactions tab 716 shows transactions per second 722 over time 738. As an example, the graph shows about 149 successful transactions per second 726 at about 2.4 seconds into the test. The graph also shows a peak of about 240 attempted transactions per second 724 at about 2 seconds into the test. Few unsuccessful transactions 728 appear at the base of the timeline throughout the test.

Another network test type validates the performance of a web server 108 in the DMZ from a workstation 134 at a third remote office 138. The focus of the test in this example is the web server 108, the network latency caused by the satellite link 126, the router 104, and the firewall 106. Also included in this example are the firewall 110, the router 112, and a database server in the data center 116 that provides data to the web server 108.

In this example test type, the HTML log files for a session between the remote workstation 134 and the DMZ server 108 are captured from the DMZ 108 server, and imported into the network test generator 132 in the role as test generator. The test generator 132 can then simulate the transactions generated by the workstation 134 toward the web server 108 and evaluate the performance of the devices within focus. Traffic can be exchanged loosely according to a protocol, or by simulating the client and server-side interactions and strictly conforming to a protocol. This will provide testing, analysis, and reporting about the network between the remote workstation 134 and the web server 108. In another test, the test generator 132 can edit and scale the history provided by the web server 108 logs to simulate many thousands of simultaneous or near simultaneous users to perform a load test on the web server 108 from the third remote office 138. In this example, the network test generator 114 in the role of test responder has been programmed with the traffic that was recorded by the router 112 in its flow export report 318 for the interactions between the web server 108 and the database server in the data center 116. The data used by the test responder 114 is synchronized with the data used by the test generator 132. This allows the operator of the test to analyze the functionality of the network equipment involved in these transactions based on published standards. It also allows the operator to test the performance of the related network equipment.

In another implementation, a test may be performed between the remote workstation 134 and various network devices on the first remote office 122. In this example, a flow export report 318, or other transaction log, is generated by the firewall/router 124 for traffic between the remote workstation 134 and the target devices in the first remote office 122 for some period of time. This transaction log can then be adapted as necessary, and then uploaded into a network test generator 132 in the role of test generator, and a network test generator 128 in the role of test responder. This would allow protocol, standards, and performance testing of the satellite link 126, the firewall/router 124, and the switch 125.

Correlation can also be calculated on sets of tests. For example, FIG. 8 is an example of a box-and-whisker plot report generated from a set of recorded performance snapshots that were collected during a performance test of a particular URL 816. Box-and-whisker plots are a convenient way of graphically depicting groups of numerical data through their quartiles, while also demonstrating skew and dispersion. The first quartile is defined as the middle number between the smallest number and the median of the data set. The second quartile is the median of the data. The third quartile is the middle value between the median and the highest value of the data set. Each box represents the interquartile range (IQR), or middle half of the data, where the size of the box indicates the distribution around the median. The values for the minimum and maximum datum are represented by the ends of each "whisker" on each end of the box. In one implementation, the chart 802 can be used to align the box-and-whisker plot with the mean, minimum, and maximum values 806 obtained in the set of performance snapshots. In this example, the radio button "align mean" is selected, which aligns each box-and-whisker object on the screen based on their mean value, which is displayed, top to bottom, as a cumulative frequency histogram indicating a sequence starting with URL1 and ending with URL6. By selecting "align max" or "align min", the box-and-whisker objects would be aligned within the cumulative frequency histogram by their maximum or minimum values, respectively.

In another implementation, the chart 802 summarizes performance test statistics under a particular load as that load increases from its initial value to its ultimate value for the test 814. The results demonstrated by horizontal box-and-whisker objects starting with URL1 804 can be curve fitted for both extrapolation and interpolation, which can allow for an estimation of sensitivity to load for values not tested. The curve fit will not reveal specific events within the data, but will allow drilling down into the data for research. In this example, URL 5 810 can be color coded, or otherwise marked, to reveal that it is the most sensitive of the 6 URLs listed for the performance snapshots of the performance test. The box-and-whisker object 812 has the greatest distribution of the time required to load a particular URL 810 as the load increased for the life of the performance test. This indicates that 812 is very sensitive to load.

Computer System

FIG. 9 is a block diagram of an example computer system, according to one implementation. Computer system 910 typically includes at least one processor 914 that communicates with a number of peripheral devices via bus subsystem 912. These peripheral devices may include a storage subsystem 924 including, for example, memory devices and a file storage subsystem, user interface input devices 922, user interface output devices 920, and a network interface subsystem 916. The input and output devices allow user interaction with computer system 910. Network interface subsystem 916 provides an interface to outside networks, including an interface to corresponding interface devices in other computer systems.

User interface input devices 922 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 910.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules and methods described herein. These software modules are generally executed by processor 914 alone or in combination with other processors.

Memory 926 used in the storage subsystem can include a number of memories including a main random access memory (RAM) 930 for storage of instructions and data during program execution and a read only memory (ROM) 932 in which fixed instructions are stored. A file storage subsystem 928 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 928 in the storage subsystem 924, or in other machines accessible by the processor.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9.

Particular Implementations

In one implementation, the technology disclosed includes a method of generating a mix of network traffic type for a network test, which can include accessing a summary of historical network accounting records of network traffic type distribution among supported application layer protocols. This includes at least one time interval in the historical network accounting records, using a processor to generate a test traffic mix profile among the supported application layer protocols from analysis of the historical network accounting records. It also includes loading the test traffic mix profile into memory of a network test appliance, and adapting the test traffic mix profile responsive to user input specifying at least a range of test traffic loads. It include identifiers of first and second test appliances, and network addresses to use for the first and second test appliances. It allows for the initiation of a performance test over a network connection between the first and second test appliances using traffic generated using the adapted test traffic mix profile, and measuring and reporting test results.

In another implementation, the technology disclosed includes generating test traffic mix profiles for multiple time intervals, and running the performance test against the multiple time intervals without requiring user intervention between the time intervals. It also includes generating test traffic mix profiles for multiple time intervals and at least relative load factors, modifying application of the range of test traffic loads to the multiple time intervals based on the relative load factors, and running the performance test against the multiple time intervals without requiring user intervention between the time intervals.

In other implementations, the network accounting records of network traffic volume indicate network traffic volume statistics for the network traffic types. This allows for calculating a distribution of network traffic volume from the network accounting records, and varying test traffic load during the time interval corresponding to the network traffic volume distribution.

In another implementation, the network traffic types of supported application protocols include at least BitTorrent, BitTorrent Bandwidth, BitTorrent Tracker Traffic, FTP, Gnutella 1, Gnutella 2, Gtalk, HTTP, LDAP, MySQL, NFS, NFS V2 UDP, Oracle, Raw TCP, Remote Desktop, Skype, SMB, SMB DCERPC for Printer, SQL, SQL Queries only, SQL Redirect and Queries, TCP, Telepresence, Video, Video Call, Voice Call, and Yahoo Commands Only.

In another implementation, this will include accessing and using the historical accounting records that specify transport layer, network layer, and data link layer information about network traffic. It will also include using multiple first test appliances on the same network segment to generate test traffic to multiple second test appliances on one or more other network segments, and adapting the test traffic mix profile responsive to user input specifying default or selected values for quality of service (QoS) priority levels, packet frame size, VLAN labels and MLPS values.

In another implementation, the method includes the first test appliance connecting with the second test appliance and communicating test parameters for the second test appliance to use during the performance test, and where the first and second test appliances can be separated by a wide area network. Alternately, additional test appliances on additional network segments cam be different than network segments to which the first and second test appliances are connected. This, too, can allow accessing the historical accounting records, adapting the historical accounting records, and generating the test traffic inclusive of traffic related to the additional test appliances, and running the performance test over the first, second and additional test appliances.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Other implementations may include tangible computer-readable memory including computer program instructions that cause a computer to implement any of the methods described above. Yet another implementation may include a system including memory and one or more processors operable to execute instructions, stored in the memory, to perform any of the methods described above.

While the technology disclosed is by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims.

The invention claimed is:

1. A method of generating a mix of network traffic types for conducting a network test on a target network segment between first and second test appliances configured respectively as a test generator and a test responder and connected to the network segment of a network under test, the method including:
   accessing at least a summary of historical network accounting records that include network traffic type distribution among supported application layer protocols identified in flows in the network under test;
   for at least one time interval in the historical network accounting records, using a processor to generate a test traffic mix profile among the supported application layer protocols from analysis of the historical network accounting records;
   loading the test traffic mix profile into memory of a network test appliance;
   adapting the test traffic mix profile responsive to user input specifying at least a range of test traffic loads, identifiers of first and second test appliances, and network addresses to use for the first and second test appliances;
   initiating over a network connection, a performance test of the target network segment that lies between the first and second test appliances disposed at different sides of the network connection including a server side and a client side; wherein (i) the first test appliance, acting as a test generator, regenerates adapted network traffic by simulating activity, of one or more of a plurality of network devices of a first side selected from the client side and the server side of the network segment of the network under test, as captured in the historical network accounting records that were used to generate the adapted test traffic mix profile and (ii) the second test appliance acting as a test traffic responder, responds to the traffic generated by the first test appliance by simulating activity, of one or more of a plurality of network devices of a second side selected from the client side and the server side of the network segment of the network under test, as captured in the historical network accounting records; and
   measuring and reporting test results from conducting the performance test upon the target network segment.

2. The method of claim 1, further including:
   generating test traffic mix profiles for multiple time intervals; and running the performance test against the multiple time intervals without requiring user intervention between the time intervals.

3. The method of claim 1, further including:
generating test traffic mix profiles for multiple time intervals and at least relative load factors;
modifying application of the range of test traffic loads to the multiple time intervals based on the relative load factors; and
running the performance test against the multiple time intervals without requiring user intervention between the time intervals.

4. The method of claim 1, further including:
wherein the historical network accounting records of network traffic volume indicate network traffic volume statistics for the network traffic types;
calculating a distribution of network traffic volume from the historical network accounting records; and
varying test traffic load during the time interval corresponding to the historical network traffic volume distribution.

5. The method of claim 1, wherein the network traffic types of supported application protocols include at least BitTorrent, FTP, Gnutella, Gtalk, HTTP, LDAP, MySQL, Oracle, Raw TCP, Remote Desktop, Skype, SMB, SQL, Telepresence, Video, Video Call, and Voice Call.

6. The method of claim 1, wherein the network traffic types of supported application protocols include at least BitTorrent, BitTorrent Bandwidth, BitTorrent Tracker Traffic, FTP, Gnutella 1, Gnutella 2, HTTP, MySQL, NFS, SMB, and SQL.

7. The method of claim 1, wherein the network traffic types of supported application protocols include at least Gtalk, HTTP, Raw TCP, Skype TCP, Telepresence, Video, Video Call, Voice Call, and Yahoo Commands Only.

8. The method of claim 1, wherein the network traffic types of supported application protocols include at least BitTorrent, BitTorrent Bandwidth, BitTorrent Tracker Traffic, FTP, Gnutella 1, Gnutella 2, Gtalk, HTTP, LDAP, MySQL, NFS V2 UDP, Oracle, Raw TCP, Remote Desktop, Skype TCP, SMB DCERPC for Printer, SQL Queries only, SQL Redirect and Queries, Telepresence, Video, Video Call, Voice Call, and Yahoo Commands Only.

9. The method of claim 1, further including accessing and using the historical accounting records that specify transport layer information about network traffic.

10. The method of claim 1, further including accessing and using the historical accounting records that specify network layer information about network traffic.

11. The method of claim 1, further including accessing and using the historical accounting records that specify data link layer information about network traffic.

12. The method of claim 1, further including using multiple first test appliances on the same network segment to generate test traffic to multiple second test appliances on one or more other network segments.

13. The method of claim 1, further including adapting the test traffic mix profile responsive to user input specifying default or selected values for quality of service (QoS) priority levels, packet frame size, VLAN labels and MLPS values.

14. The method of claim 1, further including the first test appliance connecting with the second test appliance and communicating test parameters for the second test appliance to use during the performance test.

15. The method of claim 1, wherein the first and second test appliances are separated by a wide area network.

16. The method of claim 1, further including:
using additional test appliances on additional network segments different than network segments to which the first and second test appliances are connected,
accessing the historical network accounting records, adapting the historical network accounting records, and generating test traffic inclusive of traffic related to the additional test appliances; and
running the performance test over the first and second test appliances and the additional test appliances.

17. The method of claim 1, further including conducting stress testing, by:
duplicating or scaling captured flow information to represent additional devices and sessions; and
forming regenerated flow data to stress the network under test, from a first data flow level to successively greater flow levels thereby causing a response degradation, by:
receiving from an operator identification of minimum and maximum megabytes per send (MBPS) from the captured flow information; and
generating test traffic according to the minimum and maximum MBPS.

18. A test system that generates a mix of network traffic types for conducting a network test on a target network segment between first and second test appliances connected to the network segment of a network under test, the system including:
a controller that includes a processor, memory and instructions in the memory that implement:
accessing at least a summary of historical network accounting records that include network traffic type distribution among supported application layer protocols identified in flows in the network under test;
for at least one time interval in the historical network accounting records, using a processor to generate a test traffic mix profile among the supported application layer protocols from analysis of the historical network accounting records;
adapting the test traffic mix profile responsive to user input specifying at least a range of test traffic loads, identifiers of first and second test appliances, and network addresses to use for the first and second test appliances;
a first test appliance that includes a processor, network interface, memory and instructions in the memory that implement:
for at least one time interval in the historical network accounting records, using a processor to generate a test traffic mix profile among the supported application layer protocols from analysis of the historical network accounting records;
adapting the test traffic mix profile responsive to user input specifying at least a range of test traffic loads, identifiers of first and second test appliances, and network addresses to use for the first and second test appliances;
a second test appliance that includes a processor, network interface, memory and instructions in the memory that implement receiving and responding to test messages from the first test appliance;
the controller further implementing:
initiating over a network connection, a performance test of the target network segment that lies between the first and second test appliances disposed at different sides of the network connection including a server side and a client side; wherein (i) the first test appliance, acting as a test generator, regenerates adapted network traffic by simulating activity, of one or more of a plurality of network devices of a first side selected from the client side and the server side of the network segment of the network under test, as captured in the historical network accounting records that were used to generate the adapted test traffic mix profile and (ii) the second test appliance acting as a test traffic responder, responds to the traffic generated by the first test appliance by simulating activity, of one or more of a plurality of network devices of a second side selected from the client side and the server side of the network segment of the network under test, as captured in the historical network accounting records; and reporting test results from conducting the performance test upon the target network.

19. The system of claim 18, the controller further implementing:
generating test traffic mix profiles for multiple time intervals; and
initiating the performance test against the multiple time intervals without requiring user intervention between the time intervals.

20. The system of claim 18, the controller further implementing:
generating test traffic mix profiles for multiple time intervals and at least relative load factors;
modifying application of the range of test traffic loads to the multiple time intervals based on the relative load factors; and
initiating the performance test against the multiple time intervals without requiring user intervention between the time intervals.

21. The system of claim 18, further including:
wherein the historical network accounting records of network traffic volume indicate network traffic volume statistics for the network traffic types;
the controller further implementing:
calculating a distribution of network traffic volume from the historical network accounting records; and
setting test parameters to vary test traffic load during the time interval corresponding to the network traffic volume distribution.

22. The system of claim 18, wherein the network traffic types of supported application protocols include at least BitTorrent, FTP, Gnutella, Gtalk, HTTP, LDAP, MySQL, Oracle, Raw TCP, Remote Desktop, Skype, SMB, SQL, Telepresence, Video, Video Call, and Voice Call.

23. The system of claim 18, further including multiple first test appliances on the same network segment that transmit test traffic to multiple second test appliances on one or more other network segments.

24. The system of claim 18, the controller further implementing adapting the test traffic mix profile responsive to user input specifying default or selected values for quality of service (QoS) priority levels, packet frame size, VLAN labels and MLPS values.

25. The system of claim 18, further including the first test appliance connecting with the second test appliance and communicating test parameters for the second test appliance to use during the performance test.

26. The system of claim 18, wherein the first and second test appliances are separated by a wide area network.

27. The system of claim 18, further including:
additional test appliances on additional network segments different than network segments to which the first and second test appliances are connected,
the controller further implementing
accessing the historical network accounting records, adapting the historical network accounting records, and generating test traffic inclusive of traffic related to the additional test appliances; and
initiating the performance test over the first and second test appliances and the additional test appliances.

* * * * *